United States Patent [19]

Elliott

[11] Patent Number: 4,562,382

[45] Date of Patent: Dec. 31, 1985

[54] SOLID-STATE INVERTER INCLUDING A MULTIPLE CORE TRANSFORMER

[75] Inventor: William J. Elliott, Zephyr Cove, Nev.

[73] Assignee: Quietlite International Ltd., Reno, Nev.

[21] Appl. No.: 594,119

[22] Filed: Mar. 28, 1984

Related U.S. Application Data

[63] Continuation-in-part of Ser. No. 444,536, Nov. 26, 1982, abandoned, which is a continuation-in-part of Ser. No. 308,780, Oct. 5, 1981, abandoned.

[51] Int. Cl.$^4$ .......................................... H05B 37/02
[52] U.S. Cl. .................................. 315/219; 315/223; 315/205; 331/113 A
[58] Field of Search ............... 315/219; 331/113 A

[56] References Cited

U.S. PATENT DOCUMENTS

| | | | |
|---|---|---|---|
| 3,092,786 | 6/1963 | Bayne | 331/113 A |
| 3,403,319 | 9/1968 | Tate | 331/113 A |
| 3,411,108 | 11/1968 | Phillips | 331/113 A |
| 4,177,509 | 12/1979 | Bullings | 331/113 A |
| 4,414,491 | 11/1983 | Elliott | 315/219 |

*Primary Examiner*—Harold Dixon
*Attorney, Agent, or Firm*—Allegretti, Newitt, Witcoff & McAndrews, Ltd.

[57] ABSTRACT

A D.C. to A.C. inverter using switching transistors driving a multiple-core transformer which includes a high-permeability saturable core upon which both the primary and secondary windings are wound and one or more lower permeability non-saturating cores upon which the primary and/or secondary windings are wound to provide additional self-inductance. The inverter switching transistors drive the two halves of the transformer's center-tapped primary winding on alternate half-cycles under the control of a feedback winding which is wound on the saturable core. A non-saturating core about which the primary winding is wound, and a capacitor connected in parallel with both halves of the primary winding, protects the switching transistors against transients, prevents the saturating core from going into hard saturation, and efficiently transfers energy stored in the leakage inductance of the primary winding from half-cycle to half-cycle. A second non-saturating core about which the secondary winding is wound contributes additional self-inductance to the output circuit to limit output currents to a safe value, allowing the inverter to be operated safely with short-circuited output terminals or an electron discharge lamp, which exhibits dynamic negative resistance. Control windings on the two non-saturating cores and serially connected with a variable impedance are used to control and/or regulate the magnitude of electrical energy delivered to the load. The multicore transformer is assembled by means of bobbin wound primary and secondary windings through which the center leg of ferrite E-core shapes may be inserted to provide the desired saturating and non-saturating flux paths.

20 Claims, 8 Drawing Figures

SOLID-STATE INVERTER INCLUDING A MULTIPLE CORE TRANSFORMER

CROSS REFERENCE TO RELATED APPLICATIONS

This application is a continuation-in-part of Ser. No. 444,536 filed 11-26-82 which is a continuation-in-part of Ser. No. 308,780 filed Oct. 5, 1981, both of which are abandoned.

SUMMARY OF THE INVENTION

This invention relates to electronic power supply systems and more particularly, although in its broader aspects not exclusively, to a high-frequency power source for use in connection with electron discharge lamps.

Because of their energy efficiency and long life, electron discharge lamps are increasingly replacing conventional incandescent (tungsten filament) lamps, particularly in commercial, industrial and outdoor lighting applications. Discharge lamps, including both fluorescent lamps and high intensity discharge (H.I.D.) lamps, create light by the passage of an electric current through a vapor or a gas, rather than through a tungsten wire. Such lamps present a dynamic negative resistance to the power source: that is, as the current through the lamp increases, the voltage across the lamp goes down. Moreover, immediately following ignition and before the lamp reaches its normal operating temperature, the voltage across the lamp is quite low. As a consequence, some means of limiting the magnitude of lamp current must be included in the power supply. Typically, such current limiting is accomplished by means of a reactive "core and coil" ballast serially connected with the lamp across the 60 Hz. alternating current line.

It is an object of the present invention to provide a small, light weight and inexpensive power supply for use in connection with electron discharge lamps and other electrical loads which require a current limiting capability.

The present invention takes the form of a novel solid-state inverter for delivering a controlled level of high-frequency alternating current energy to a suitable load, such as one or more electron discharge lamps. The inverter makes use of a novel power transformer arrangement composed of plural, magnetically isolated, core structures. Switching transistors supply high-frequency power to the primary winding of the transformer which is coupled to the transformer's secondary winding by the flux path provided by a high-permeability, saturating core. A feedback winding, also wound on the saturating core, delivers turn-ON and turn-OFF signals to the switching transistors as the flux density in the saturable core reaches predetermind saturation levels, maintaining the inverter in self-oscillation.

In accordance with a feature of the invention, the primary winding is also wound on a second core providing a low-permeability, non-saturating flux path which links the primary core alone. The addition of the second, low-permeability core substantially increases the efficiency and reliability of the inverter by limiting the surge of transistor current which would otherwise flow when the first core enters saturation, and by preventing the first core from being driven into hard saturation. As a result, both the switching transistors and the saturable core are placed under less stress and generate less heat. Moreover, the addition of the second low-permeability core eliminates the need for special circuits to protect the transistors from voltage or current transients and insures that the transistors, when being turned ON, receive adequate base current drive before full collector current is applied.

The inverter contemplated by the present invention further includes a capacitor connected in parallel with the primary winding which, in combination with the self-inductance introduced in the primary winding by the second core, forms a tank circuit which delays the turn-ON time of the OFF transistor. The tank circuit protects the inverter against simultaneous conduction of the transistors, transfers the energy stored in the cores from half-cycle to half-cycle for improved efficiency, and enhances the transistors switching transitions when non-square-loop materials are employed for the saturating core.

According to a further feature of the invention, the transformer structure may include a third core which provides a low-permeability, non-saturating flux path which links the secondary winding but which is isolated from the primary winding. The third core contributes self-inductance to the secondary winding which, together with the self-inductance contributed to the primary winding by the second core, eliminates the need for a separate ballast inductor when the inverter is employed to supply power to a negative-resistance load such as an electron-discharge lamp.

A self-oscillating saturating inverter constructed in accordance with the foregoing principles is characterized by a reduced number of electronic components and an increased simplicity of fabrication, allowing a substantial reduction in manufacturing costs. Additionally, the power supply contemplated by the present invention operates with a reduced number of electronic control components operating at reduced power levels, while maintaining a closely coupled relationship between the power handling primary and secondary windings for enhanced device efficiency. When used to power a flourescent lamp load, overall system efficiency is improved by operating the supply at a high frequency to improve the lumen output efficiency of the lamps while eliminating the need for a separate ballast which would otherwise be required to provide the current-limiting.

According to another feature of the invention, the three core transformer can be inexpensively mass-produced using bobbin-wound primary and secondary windings and six ferrite E-core parts. Two larger E-core parts fit together to form a figure-8-shaped saturating core whose center-leg passes through both the primary and secondary winding bobbins. The remaining four E-core parts form a pair of figure-8-shaped non-saturating cores, each having a gapped center-leg. The center leg of one of the non-saturating cores passes through the primary winding bobbin alone and the center-leg of the other non-saturating core passes through the secondary bobbin alone. The resulting three core structures and the two winding bobbins are positioned in a closely nested, side-by-side relationship to form a compact transformer. To further conserve space, the electronic components of the inverter may be made an integral part of the transformer structure, utilizing the ferrite core structures as thermal mass for reducing the operating temperature of the transistors.

In accordance with still another feature of the invention, a lamp starting circuit can advantageously be incorporated into the system by pulsing a starting winding looped around the third core which is coupled to the secondary winding by mutual inductance. The lamp starting circuit advantageously takes the form of a current impulse generator which is connected to the starting winding and which includes a threshold circuit for repetitively discharging an accumulating capacitor through the starting winding whenever the voltage across the lamp exceeds a predetermined value.

According to still another feature of the invention, the level of energy supplied to the output load may be advantageously controlled by the combination of a control winding wound on the non-saturating secondary core and means for varying the level of current flowing in the control winding to alter the output impedance of the inverter.

These and other objects, features and advantages of the present invention may be more clearly understood through a consideration of the following detailed description of preferred embodiments of the invention. In the course of this description reference will frequently be made to the attached drawings in which:

DETAILED DESCRIPTION

Figure 1:
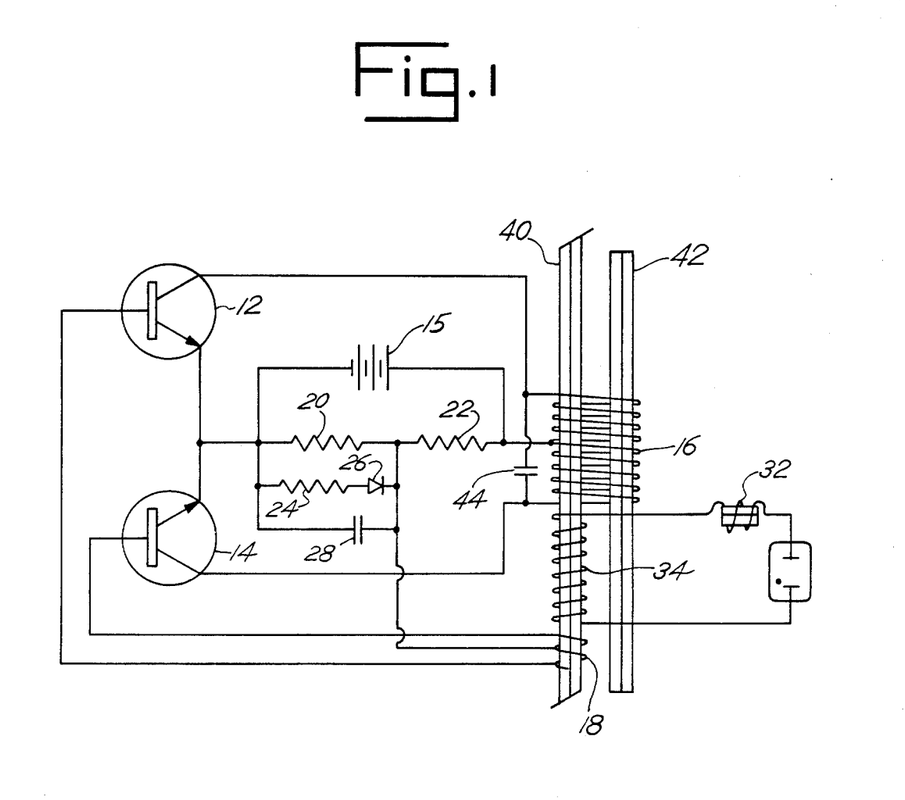
FIG. 1 is a schematic diagram of a first embodiment of the invention employing a non-saturating core to introduce self-inductance into the primary winding in a saturating inverter.

A high-frequency power supply system illustrating one application of the principles of the invention is shown in FIG. 1 of the drawings. The supply is composed of a free-running inverter circuit of a generally conventional type known as a "Royer oscillator" in which power is coupled to the load circuit by a transformer comprising primary, secondary and feedback windings wound on a saturable core and which, in accordance with one aspect of the present invention, further includes an additional, non-saturating core of low permeability upon which the primary winding alone is wound.

The inverter includes a pair of NPN switching transistors 12 and 14 connected in a push-pull, common-emitter circuit, the emitter of each transistor being connected to the negative terminal of a direct current power source 15 and the collector of each being connected to one end of a primary winding 16. The center tap of primary winding 16 is connected to the positive terminal of the D.C. source 15.

The transconductive (collector-emitter) paths of the transistors 12 and 14 are switched between non-conductive and conductive states in phase-opposition by the voltage appearing across a feedback winding 18, each end of which is connected to the base of one of the transistors 12 and 14.

The base drive needed to reliably start and operate the oscillator circuit is provided by a network composed of resistors 20, 22, and 24, a diode 26, and a capacitor 28. Resistors 20 and 22 are connected in series across the D.C. source and their junction is connected to a center-tap on the feedback winding 18 to provide an initial forward-biasing base potential to both transistors. After the circuit goes into oscillation, base-emitter current flowing through the ON transistor (due to the presence of a turn-on voltage across the connected half of feedback winding 18) flows through the series combination of resistor 24 and diode 26. The resistance of resistor 24, being much smaller than that of resistors 20 and 22, provides a low impedance base-current return path to insure adequate switching current levels, and the speed-up capacitor 28, which is connected in parallel with the series combination of resistor 24 and diode 26, insures that the steep wave-fronts of the switching voltage generated across feedback winding 18 are immediately applied across the base-emitter junctions of the switching transistors.

The power supply system according to the present invention is particularly adapted for supplying a high-frequency operating voltage to an electric discharge lamp load, represented in FIG. 1 by the series combination of a lamp 30 and an inductive ballast 32 connected between the terminals of a secondary winding 34. The lamp load circuit may comprise plural lamps connected in series and a series capacitor may be employed to provide the current-limiting reactance.

In a conventional Royer oscillator, the primary, secondary and feedback windings are each wound on a single core composed of a saturable ferrous material exhibiting a substantially square hysteresis characteristic. In accordance with a feature of the present invention, this conventional saturable transformer arrangement is modified by including a second, non-saturating core of substantially lower permeability about which the primary winding alone is wound. In the FIG. 1, these two cores are schematically represented by the saturable core 40 and the non-saturating core 42. In practice, the two cores may take the form of two stacked rectangular (or circular) ungapped toroidal cores constructed of two different materials having substantially different permeabilities; e.g. the saturating core may be a tape wound square permalloy core while the low permeability core may be a molybdenum permalloy powder core, the two cores presenting substantially similar magnetic path lengths and similar shapes to facilitate stacking and winding, but may typically have different cross-sectional areas to provide the correct relative reluctances. Alternatively, as will be discussed later in connection with FIG. 5, the two-core transformer may be more inexpensively mass-produced using ferrite cores and bobbin-wound windings.

The addition of the second core 42 seen in FIG. 1 substantially improves the operating efficiency of the inverter by reducing the amount of heat generated by the switching transistors 12 and 14 as well as the heat generated within the saturable core 40. The improved operation of the overall system is believed to result from effects which may be better understood by first reviewing the mode of operation of a conventional Royer oscillator and then turning to a consideration of the manner in which the low-permeability core 42 alters the oscillator's regenerative switching cycle.

The circuit shown in FIG. 1, *without* additional core 42, would operate as follows:

When transistor 12 conducts, the DC source voltage is applied across the upperhalf of primary winding 16, the transistor 14 being turned OFF (and transistor 12 being turned ON) by the voltage induced in feedback winding 18 by the changing flux level in the saturable core 40. As the "square" core 40 enters saturation, the impedance presented by primary winding 16 drops dramatically and the collector current in transistor 12 rises to a magnitude which is limited by the ability of the lower half of feedback winding 18 to supply adequate base drive. Because the rate-of-change of the core-exciting primary current then drops, the forward-biasing voltage induced in the lower half of winding 18 is also reduced, making even less base drive available to transistor 12. The consequent negative rate-of-change of primary current, in turn, reverses the polarity of the voltages induced in all the windings, turning transistor 12 OFF and turning transistor 14 ON.

There are at least two important undesireable side-effects resulting from this switching action, and both are traceable to the surge of primary collector current which flows when the core 40 enters saturation. Because the current surge through the transistor occurs at the same time its collector-emitter voltage rises (due to the impedance drop across the primary winding), the heat which must be dissapated by the transistor increases significantly and, if uncorrected, the resultant stress may destroy the transistor. Additional circuit elements, called "snubbing networks", may be added to protect the transistor, but these additional components increase the cost of the system and provide an inadequate reduction in transistor heat dissapation. The second adverse effect of the primary current surge is the heat loss in the saturable core 40 itself. The large primary current which flows drives the core 40 into hard saturation and increases the resistive heat losses in the primary winding itself. Both effects lower the efficiency of the system and raise the temperature of the transformer.

When the low-permeability core 42 is included, the operating characteristics of the circuit are significantly improved by substantially reducing the surge of collector/primary current when the core 40 enters saturation. The addition of the low-permeability core 42 introduces a small but operationally significant distributed inductance along the primary winding 16. Although core 42 normally exhibits a much lower permeability (and hence a much higher reluctance) than core 40, it does not saturate when subjected to a magnetic field whose field strength is adequate to fully saturate core 40. Thus, when the core 40 saturates, current can no longer increase instantaneously in the primary winding 16, even though the rate-of-change of flux in core 40 decreases dramatically, removing forward base drive to the ON transistor because of the loss of voltage across the feedback winding 18. Because the surge of current in the primary winding 16 is suppressed, core 40 is never driven into hard saturation, and less transformer heating occurs.

The use of the additional non-saturating core 42 creates a further effect which is believed to have a significant beneficial impact on circuit operation. It is known that, in a regenerative oscillator in which push-pull transistors drive a center-tapped primary winding wound on a saturable core, care should be taken to avoid leakage reactance in the primary winding which will tend to generate voltage spikes. For this reason, the two halves of the primary winding are typically wound as interleaved bifilar windings to achieve balance and close mutual coupling between the two sides of the primary. In this way, flux changes in one half of the primary winding are also coupled to the second half. The presence of the low-permeability core 42 enhances the mutual coupling between the two halves of primary winding 16 when the core 40 saturates. In this way, flux changes in one half of the primary winding are also coupled to the second half. The presence of the low-permeability core 42 enhances the mutual coupling between the two halves of primary winding 16 when the core 40 saturates. In this way, the voltage transients which would otherwise occur when each transistor turns OFF are reduced, and the forward collector-emitter current in the transistor turning ON is reduced momentarily until full base drive from the winding 18 is available. Both effects reduce the stress and heating to which the transistors are subjected.

Note, that, when core 40 saturates, the primary winding is de-coupled from the secondary winding 34 and the feedback winding 18. The primary winding 16 and the capacitor 44 together form a resonant tank circuit. When core 40 saturates and the formerly conducting transistor turns off, the current flowing in the primary winding charges the capacitor 44 to its maximum charge. The primary current then reverses, bringing the core 40 out of saturation, and turning ON the formerly OFF transistor. This quarter-cycle ringing effect created by capacitor 44 creates a dead-time which holds the core 40 at saturation until the current reverses in the tank circuit, thus insuring that the two transistors will not conduct simultaneously. The circuits ability to prohibit simultaneous conduction is aided by capacitor 28, which speeds the turn-OFF of the ON-transistor.

It should be noted that the ringing circuit operates to efficiently transfer the energy stored in the non-saturating core from one half-cycle to the next via the capacitor 44. When the ON-transistor turns off, the energy stored in the linear core charges capacitor 44 to its maximum value and this charge then flows in a reverse direction through the primary windings, bringing the core 40 out of saturation and aiding the rapid turn-ON of the formerly OFF transistor.

It should also be further noted that the presence of the capacitor 44 thus enhances the apparent "squareness" of the saturable core 40 and allows the circuit to operate efficiently even with rounded-loop core materials. This follows from the fact that the switching action is controlled by the ringing action, and a sharply defined saturation point is not required. As will be discussed later in connection with FIG. 4 of the drawings, the switching characteristics of the transistors can be further improved by substituting a constant current source for the resistor 24 and the diode 26 to prevent the ON-transistor from going into hard saturation.

The inverter circuit shown in FIG. 1 preferably oscillates at a frequency of 18–35 KHz. At lower frequencies, the supply may produce undesireable acoustic noise and, when the inverter is used to power flourescent lamps, lamp lumen efficiency may be degraded. At high frequencies, efficiency may decrease due to increased eddy current losses in the core and other effects.

Figure 2:
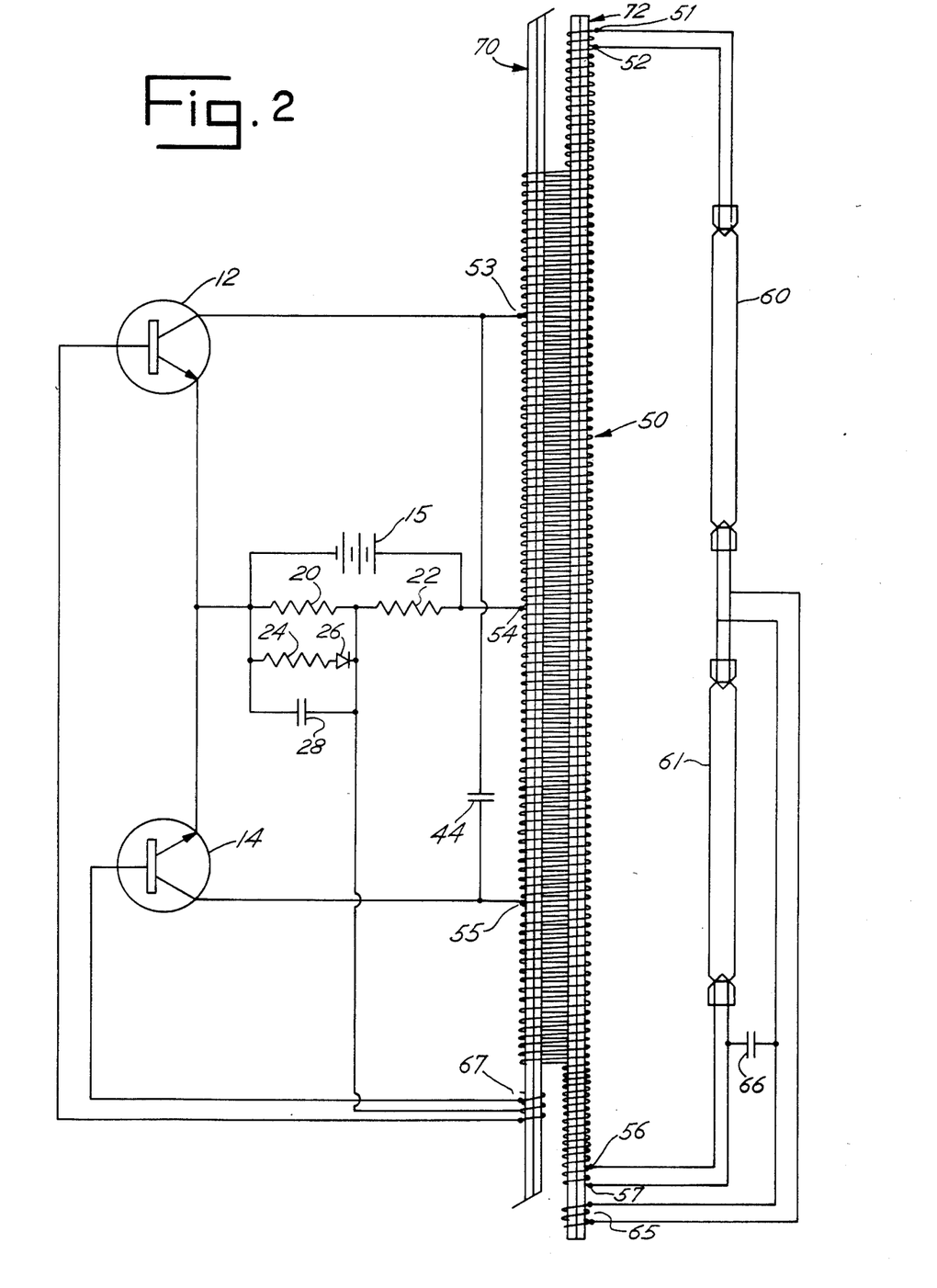
FIG. 2 is a schematic diagram of a second embodiment of the invention employing a single non-saturating core to introduce self-inductance into an autotransformer winding of a saturating inverter.

FIG. 2 depicts a solid-state inverter circuit employing a push-pull autotransformer embodying the principles of the invention. The transistor switching circuit employed in the inverter shown in FIG. 2 is like that shown in FIG. 1, and the same reference numerals have been used to designate the corresponding components of the two circuits. Unlike the inverter of FIG. 1, the arrangement shown in FIG. 2 employs a autotransformer structure in which the primary and secondary are formed from a single winding 50 provided with seven taps (connections) at 51–57. The center tap at 54 is connected to the positive terminal of D.C. source 15. Taps 53 and 55 define the extremities of the primary winding portion of winding 50 and are connected to the collectors of switching transistors 12 and 14 respectively. Taps 51 and 57 at the opposing ends of winding 50 form the secondary winding output terminals which are connected to the discharge lamp load which, as seen in FIG. 2, comprises a pair of serially connected flourescent lamps 60 and 61. Taps 52 and 56 are spaced inwardly from taps 51 and 57 respectively and provide heating currents to the outer electrodes of the lamps 60 and 61. The heaters at the other end of the two lamps are connected in parallel and are supplied with heater current by means of a separate winding 65 on the core 72. A starting capacitor 66 is connected in parallel with lamp 61 to fire lamp 60 first, followed by lamp 61. A third winding 67, wound on the saturating core 70 alone, supplies regenerative switching signals to the bases of transistors 12 and 13 and functionally corresponds to the winding 18 shown in FIG. 1.

As shown in FIG. 2, the central portion of winding 50 is wound on the two cores structures 70 and 72 while the outer, end portions of winding 50 are wound on core 72 alone. The core 70, upon which the central portion of winding 50 is wound, is made of a high-permeability ferromagnetic material having a substantially square hysteresis characteristic. The second core 72, upon which the entirety of winding 50 is wound, is constructed of a low-permeability, non-saturating material.

The transformer structure shown in FIG. 2 may be wound as follows: windings 65 and 67 are first separately wound on cores 72 and 70 respectively. The main winding 50 is then formed into a bifilar strand of two wires which is wound on core 72 alone. The two cores 70 and 72 are then placed side-by-side and the remainder of the bifilar strand is wound around both cores. The two bifilar strands are then connected in series such that their junction forms the center-tap connection 54 and their extremities form the outer secondary connections 51 and 57.

The feedback winding 67 is wound on the saturating core 70 alone such that, as in the case of the circuit of FIG. 2, when core 70 enters saturation, the forward-biasing potential applied to the ON transistor is abruptly terminated to begin the regenerative switching cycle.

The inclusion of the non-saturating core 72 prevents the transistor collector current from abruptly increasing when core 70 saturates, and prevents the core 70 from going into hard saturation, by the same general mechanism discussed in connection with FIG. 1; that is, by preventing a radical decrease in the impedance presented by the primary winding.

As shown in FIG. 2, that central portion of the winding 50 which is wound on both cores extends beyond the primary tap connections 53 and 55. By way of example, the primary winding may be composed of two 136 turn halves, and 67 additional turns may then be wound on both cores beyond the primary connections. Thereafter, both halves of the winding 50 continue outwardly with 47 more turns wound on the non-saturating core 72 alone, finally terminating with the secondary output connections 51 and 57. When the core 70 is not saturated, substantially all of the flux change occurs in core 70, whose permeability is several orders of magnitude higher than that of the core 72. As a result, during normal operation, the effective turns-ratio of the autotransformer is 136 primary turns to 368 (i.e. 136+136+67+67) seconary turns, providing a three-to-one voltage step up.

The outer portions of winding 50, being wound around the low permeability core 72 but being part sandwiches between that core and the high permeability core 70, exhibit a substantial leakage inductance. The unsaturated core 70 provides a low reluctance path for flux linkages which do not link the primary winding with the result that, at the operating frequency of the supply, the leakage inductance of the secondary is itself adequate to provide a large effective ballast reactance in series with the lamps 60 and 61 and no additional external inductance is required.

Representative circuit components which may be used to construct the arrangements shown in FIGS. 1 and 2 are listed below:

| | |
|---|---|
| Transistors 12 and 14: | NPN bipolar transistors (type MJE 13009) |
| Source 15: | 140 v. DC (115 v. AC full-wave rectified and filtered) |
| Winding 16: | 296 turns (148-TAP-148) |
| Winding 18: | 4 turns (2-TAP-2) |
| Resistor 20: | 400 ohms |
| Resistor 22: | 27,000 ohms |
| Resistor 24: | 5 ohms |
| Diode 26: | Type ES06 |
| Capacitor 28: | .4 microfarads |
| Lamp 30 (FIG. 1) and Lamps 60–61 (FIG. 2): | 2 40 Wall fluorescent lamps (type T-12) in series |
| Choke 32: | 410 turns on MMP core (Arnold type A 348032-2) |
| Winding 34: | 400 turns |
| Cores 40, 70: | Hi-permeability square permalloy core (¼ Arnold type 4535HI) |
| Cores 42, 72: | Low-permeability linear core (Arnold type MMP A 349117) |
| Winding 50: | Tap 51 to 52: 2 turns |
| | 52 to 53: 112 turns |
| | 53 to 54: 136 turns |
| | 54 to 55: 136 turns |
| | 55 to 56: 112 turns |
| | 56 to 57: 2 turns |
| Winding 65: | 2 turns |
| Winding 67: | 2 turns (1-TAP-1) |

Different lamps require different component values. For example, the circuit of FIG. 1 can be used to power a 250 watt high-pressure sodium lamp using the following components:

| | |
|---|---|
| Transistors 12 and 14: | Four (4) NPN bipolar transistors (type MJE 13009) connected in parallel replace each single transistor as shown in FIG. 1. |
| Source 15: | 115 volt A.C., full-wave rectified and filtered |
| Winding 16: | 80 turns (40-tap-40) |
| Winding 18: | 2 turns (1-tap-1) |
| Resistor 20: | 560 ohms |
| Resistor 22: | 11,000 ohms |
| Resistor 24: | 9 ohms |
| Diode 26: | Type ES06 |
| Capacitor 28: | .67 microfarads |
| Lamp 30: | High pressure sodium, 250 watt, 100 volt operating potential |
| Choke 32: | 132 turns on a molybdenum permalloy powder core (Arnold type A 349017) |
| Winding 34: | 80 turns |
| Core 40: | High permeability square permalloy (full section, Arnold type 4635HI) |
| Core 42: | Low permeability, molybdenum permalloy powder core (Arnold type A 349117) |

The open-circuit voltage supplied by the circuit of FIG. 1, using the values specified immediately above, is insufficient to initiate the arc through a high-pressure sodium lamp. A pulse-type starting circuit of the type to be described in connection with FIG. 3 may be advantageously used for this purpose.

Figure 3:
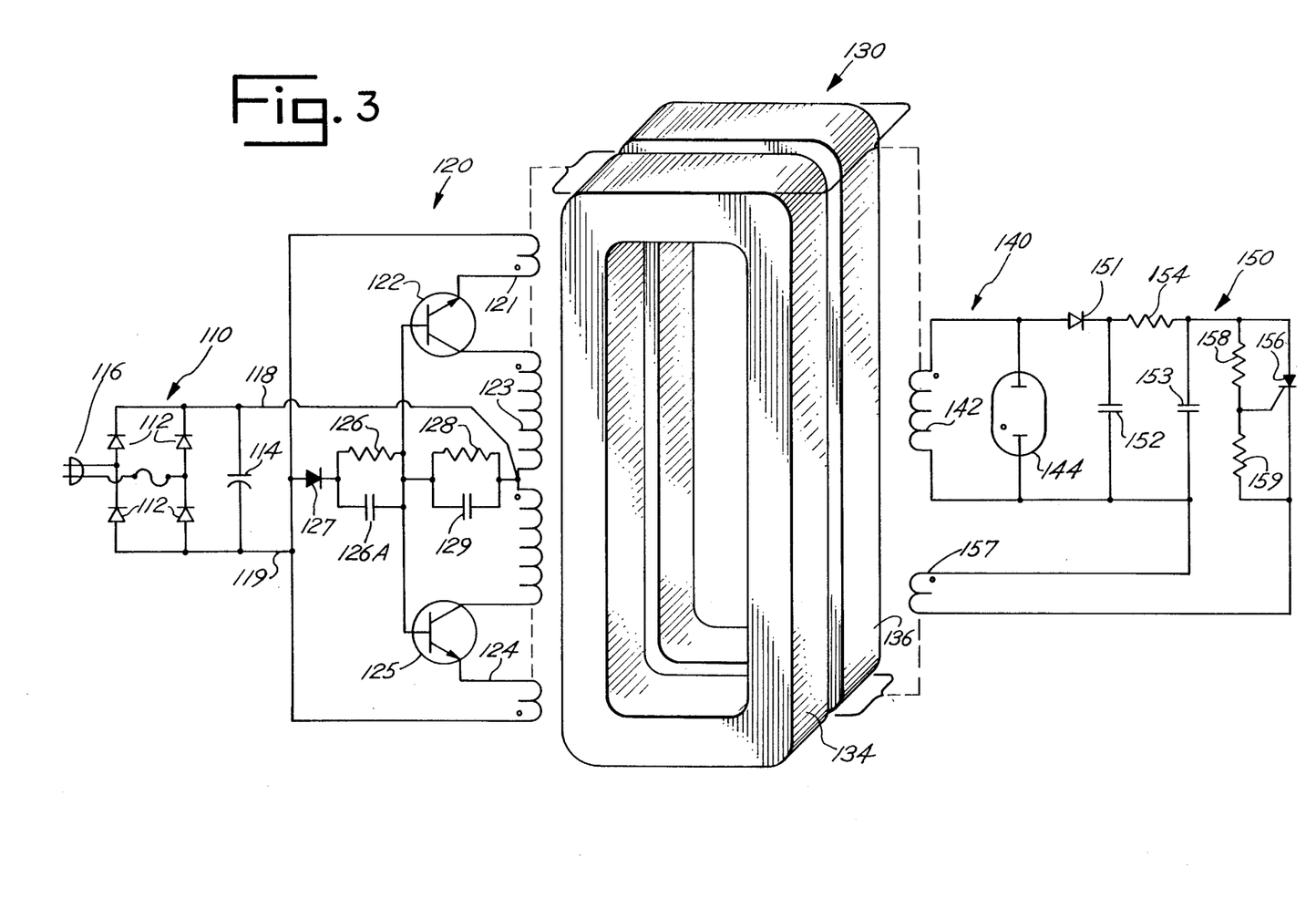
FIG. 3 is a schematic diagram of a third embodiment of the invention employing a non-saturating core for introducing self-inductance into the secondary winding of a saturating inverter, the non-saturating core also serving as part of a starting-pulse generator.

FIG. 3 of the drawings shows a solid-state inverter circuit which embodies a further aspect of the invention: the use of a low-permeability, non-saturating core to add self-inductance to the secondary winding.

The power supply shown in FIG. 3 comprises a conventional bridge rectifier, shown generally at 110, which converts alternating current line power into a direct current voltage which is supplied to a semiconductor inverter circuit indicated generally at 120. The inverter 120 supplies high frequency alternating current energy to the load circuit shown generally at 140 through a special purpose transformer wound on a ferromagnetic core structure indicated generally at 130. A starting circuit shown generally at 150 is employed to ignite the lamp seen at 144.

The direct current voltage needed to operate the inverter 120 is produced by the bridge rectifier diodes 112 and a filter capacitor 114 from a commercial 60 Hz. power source 116. The negative output 119 of the D.C. supply is connected to the positive output 118 by the series combination of an emitter winding 121, the emitter-collector path of a transistor 122, and one-half of a center-tapped winding 123. In symmetrical fashion, an emitter winding 124, the emitter-collector path of a transistor 125, and the other half of primary winding 123 is connected between outputs 118 and 119. The bases of transistors 122 and 125 are connected together and both are connected to the negative terminal 119 by the series combination of a resistor 126 and a diode 127. A capacitor 126A is connected in parallel with resistor 126. To complete the inverter circuit, the parallel combination of a resistor 128 and a capacitor 129 connects the center tap of winding 123 to the bases of transistors 122 and 125.

Winding 123 represents the power input or "primary" winding of a transformer having a core structure indicated diagrammatically at 130 in FIG. 3. The core structure comprises two independent and magnetically isolated cores 134 and 136. The windings 121, 123, and 124 of the inverter circuit 120 are wound about core 134 which is adapted to magnetically saturate during normal operation. The power output winding or "secondary" indicated at 142 in FIG. 3 is wound about both cores 134 and 136. The electron discharge lamp 144 is connected directly to the secondary winding 142 and receives a controlled level of high frequency alternating current energy therefrom.

Because many forms of electron discharge lamps require the application of a high-starting voltage in order to initiate the arc within the lamp, provision is made in the circuit of FIG. 3 for supplying such a voltage to the lamp when power (from the conventional source 116) is initially applied. Diode 151 and capacitor 152 form a half-wave rectifier to charge capacitor 153 through a resistance 154. When the voltage across capacitor 153 reaches a predetermined threshold level adequate to fire the controlled rectifier 156, capacitor 153 is discharged rapidly through starting winding 157. The voltage level at which the control rectifier 156 conducts is determined in part by the relative values of resistors 158 and 159 which together form a conventional voltage divider. Starting winding 157 is wound on core 136 only and has a small number of turns (compared to secondary winding 142). Because windings 157 and 142 are both wound around the second core 136, they operate as a step-up transformer to supply a high impulse volage across the lamp 144. Once the lamp 144 is ignited, the voltage across it drops substantially, preventing the voltage across capacitor 153 from agan rising to a point adequate to gate the controlled rectifier 156 into conduction. Note, however, that the circuit automatically attempts to re-ignite the lamp 144 with repetitive firing pulses should the lamp 144 become extinguished due, for example, to a momentary loss or reduction in line voltage.

The inverter circuit indicated generally at 120 in FIG. 3 employs a minimum of components to achieve self-starting and self-oscillating operation. When power is initially applied, a forward biasing voltage is supplied to the bases of both transistors 122 and 125 through the parallel combination of resistor 128 and capacitor 129. Because of a lack of perfect symmetry, either transistor 122 or transistor 125 will initially become more conductive than the other, resulting in a larger current flow through the connected half of the center-tapped primary 123. For example, if transistor 125 turns ON first, the current flowing from positive terminal 118 through the lower half of primary winding 123 and the conductive transistor 125 will induce a voltage in winding 124 to hold transistor 125 in conduction while a corresponding voltage in winding 121 maintains transistor 122 in an OFF condition. This state will continue until the flux density in the core 134 reaches a level adequate to saturate the core material. At this point, the rate of change of flux in the core 136 decreases, reducing and then reversing the base emitter voltages applied to transistors 122 and 125 through their control windings 121 and 124 respectively. At this time, both transistors switch conductivity states and the cycle continues. Note that the forward biasing current supplied to each transistor is supplied though its associated control winding and the forward-biased diode 127 and the resistor 126. For efficient operation, translators 122 and 125 as well as diode 127 should be characterized by fast switching times so that the two transistors make the transition between their fully OFF to fully ON states rapidly.

To limit the current lamp 144 to a safe value, the secondary winding 142 is also wound about the second core 136. Core 136 does not saturate due to its larger cross sectional area or geater saturation flux density. As a result, core 136 contributes a distributed self inductance to the winding 142 which acts as a reactive impedance to limit the current in lamp 144.

Because the cores 134 and 136 are magnetically isolated, the starting circuit indicated generally at 150 does not induce potentially damaging voltages in the primary winding 123 of the inverter 120. Any flux changes induced in core 136 by current impulses in winding 157 do not produce significant flux changes in the core 134 and hence do not induce voltage in the inverter windings. Thus it can be seen that the core structure indicated generally at 130 provides power transfer from the inverter to the lamp while isolating the inverter from the starting circuit. Note also that the winding 142 simultaneously performs three different functions which, in more conventional designs, would require three separate windings: (1) it is the secondary winding of the power transformer coupling the inverter to the lamp; (2) it is the inductor which provides the reactive impedance to limit lamp current, and (3) it is secondary winding of the starting circuit step-up transformer.

The general design procedure for selecting the configuration of the transformer is straight-forward: First the operating frequency is chosen (which, for the reasons given above, should be in the range from 17 to 22 kHz.). Second, a practical number of primary windings is selected which, together with the chosen frequency, permits the cross section and magnetic characteristics of the core 134 to be determined such that the saturation of that core will occur at the desired level of primary current. Next, the number of secondary turns is selected to achieve a voltage step-up (or step-down) such that the lamp will receive a predetermined minimum voltage (adequate to take into account lamp aging, input voltage fluctuations, etc.). Finally, with the number of secondary turns determined, the physical geometry and core material for the second core 136 may be chosen so that the secondary will exhibit adequate self inductance.

As an example, the circuit of FIG. 3 has been found to satisfactorily power a 70 watt high pressure sodium lamp using the following components:

| Component | Value |
| --- | --- |
| Diode 110 | 3 amp., 600 volt |
| Capacitor 114 | 200 Microfarad, 350 volt |
| Transistors 122 and 125 | MJE-13007 (Motorola) |
| Capacitor 126A | .2 microfarad |
| Resistor 126 | 30 ohm, 1 watt |
| Diode 127 | 3 IN914 in parallel |
| Resistor 128 | 40,000 ohms |
| Capacitor 129 | .1 microfarad |
| Windings 121 and 124 | 2-Tap-2 turns |
| Primary winding 123 | 120-Tap-120 turns |
| Secondary winding 142 | 58 turns |
| Starting winding 157 | 2 turns |
| Core 134 | Permalloy type 6T4635P1 (Arnold Engineering) |
| Core 136 | Hi-flux Type HF106060 2 (Arnold Engineering) |
| Lamp 144 | 70 watt, High Pressure Sodium |
| Diode 151 | IN4006 |
| Capacitor 152 | .47 microfarad |
| Resistor 154 | 10,000 ohms |
| Capacitor 153 | .2 microfarads |
| Controlled Rectifier 156 | C106B |
| Resistor 158 | 180,000 ohms |
| Resistor 159 | 5,600 ohms |

Although the circuit of FIG. 3 has proven to operate effectively using the component values noted above, it does not include a non-saturating core for introducing self-inductance into the primary winding, nor does it include a capacitor in parallel with the primary to provide the ringing effect noted in connection with FIG. 1. As will be next seen, the features and advantages of the foregoing embodiments can be effectively and inexpensively combined.

Figure 4:
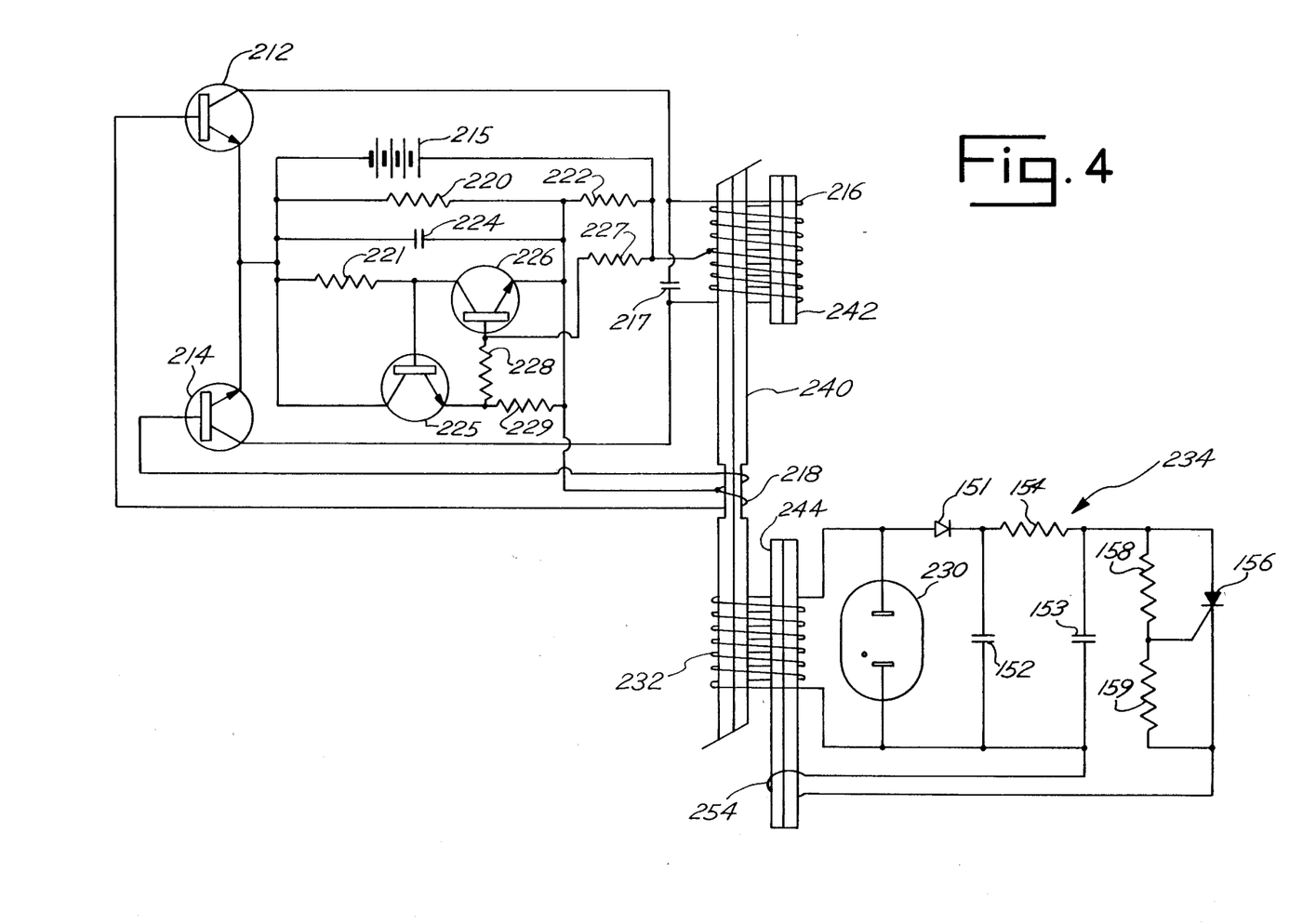
FIG. 4 is a schematic diagram of a fourth embodiment of the invention employing two non-saturating cores for introducing self-inductance into both the primary and secondary windings of a saturable inverter, and further employing an improved base-drive circuit for the switching transistors.

The inverter shown in FIG. 4 employs a pair of switching transistors 212 and 214 which supply alternating current energy from a D.C. source 215 to a primary winding 216. Capacitor 217 is connected in parallel with the primary winding to form a tank circuit. The initial starting base drive for the transistors in supplied via resistor 222 which is serially connected with resistor 220 across the source 215. Capacitor 224 allows the step wave-front turn-OFF switching signals developed at the feedback winding 218 to be applied immediately to the bases of the switching transistors.

To provide even better control over the switching transistors 212 and 214, the arrangement shown in FIG. 4 includes a voltage-compensated, constant-current source for supplying base drive to the switching transistors. Base current to the ON transistor (212 or 214) is created by the turn-ON potential across half of the feedback winding 218 and is limited by the current regulating transistor 225. An increase in current in the sensing resistor 229 forward-biases the transistor 226 which, in turn, reduces the base-drive to regulating transistor 225, tending to hold the drive to the ON transistor (212 or 214) at a level adequate to turn that transistor ON fully yet avoiding the creation of excess charge carriers which might significantly lengthen the turn-OFF time of the ON transistor.

The resistor 227 serves as a source of a variable base drive to the transistor 226, causing that transistor to become more conductive, and to in turn cause transistor 225 to become less conductive, when the supply voltage from source 215 increases. This arrangement further serves to protect the switching transistors from excessive base drive during high supply voltage conditions.

The solid-state inverter shown in FIG. 4 supplies a regulated power to an electron discharge lamp load 280 via a triple core transformer including a saturable core 240 (about which both the primary winding 216 and the secondary winding 232 are wound), a non-saturating core 242 (about which the primary winding 216 alone is wound) and a non-saturating core 244 (about which the secondary winding 232 alone is wound).

As discussed in connection with the circuit of FIG. 1, the use of the non-saturating core 242 to introduce self-inductance into the primary winding protects the switching transistors against transients and prevents the core 240 from going into hard saturation while the secondary, non-saturating core 244 introduces self inductance into the output circuit which, together with the reflected self-inductance from the primary circuit, limits lamp current without requiring a separate ballast inductor. Moreover as also discussed in connection with FIG. 3, the core 244 further functions of the core of the starting impulse generator's step-up transformer. The starting impulse generator indicated generally at 234 in FIG. 4 operates in the same fashion as described in connection with FIG. 3.

Advantageously, the feedback winding 218 is wound on a portion of the core 240 having a smaller cross-sectional area, such that saturation at that area occurs first.

Figure 5:
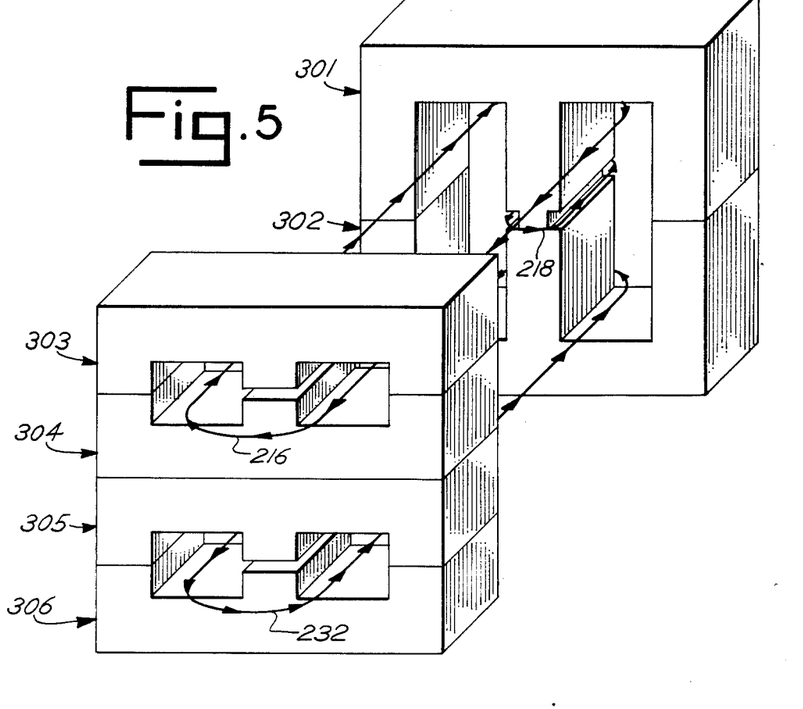
FIG. 5 illustrates the preferred method of constructing a triple-core transformer of the type employed in the circuit of FIG. 4.
Figure 6:
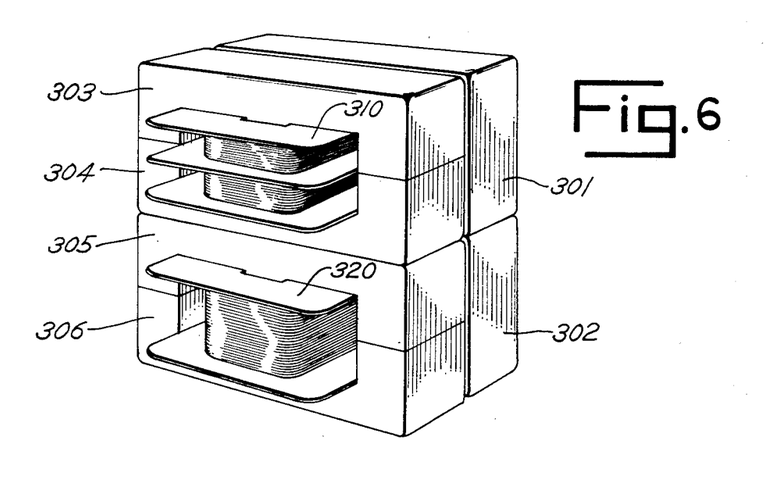
FIG. 6 illustrates a dual output transformer configuration including independent output level control windings for both outputs.

The triple core transformer shown schematically in FIG. 4 can be inexpensively mass-produced by employing the novel core and bobbin winding scheme depicted in FIGS. 5 and 6 of the drawings. As seen in FIG. 4, the triple core transformer is easily fabricated from a small number of inexpensive parts. The three cores are constructed from two larger E-core sections 301–302 and four smaller E-core sections 303–306. The two larger sections, shown at the rear in FIG. 5 together form the saturating core (shown at 240 in the schematic of FIG. 4). The smaller sections 303 and 304 together form the non-saturating primary core while sections 305 and 306 form the secondary winding's non-saturating core.

As seen in the perspective view of FIG. 6, the E-core sections 301–306 can be inserted through a pair of bobbins 310 and 320 about which the primary and secondary windings 216 and 232 respectively may be wound. Both bobbins are molded from an insulating plastic. The primary bobbin 310 includes a central flange which acts as a divider for the two halves (on each side of the center-tap) of the primary winding for improved voltage breakdown resistance. As is well known, winding reliability of both the primary and secondary windings can be further enhanced through tapeseparation of the winding layers. In addition, because of the high operating frequencies preferred, the windings may be formed from multi-conductor litz wire strands, or ribbon conductors, to increase surface area and electrical conductivity under high skin-effect conditions.

The following representative components may be employed to implement the inverter shown in FIG. 4 when the lamp load 230 is a dual 40-watt fluorescent fixture:

| | |
|---|---|
| Transistors 212, 214: | MJE 13009 power NPN |
| Transistor 225: | 2N 4400 |
| Transistor 226: | 2N 5962 |
| Capacitor 217: | .003 MFD. 800 VDC. |
| Capacitor 224: | .47 MFD. 50 VDC. |
| Resistor 220: | 1.2 K ohms, ¼ watt |
| Resistor 221: | 150 ohms, ¼ watt |
| Resistor 222: | 82 K ohms, ½ watt |
| Resistor 227: | 80 K ohms, 1 watt |
| Resistor 229: | 5.6 ohms, 1 watt |
| Primary winding: | 70-Tap-70 turns |
| Secondary winding: | 125 turns |
| Saturating core 240: | ferrite Cermag C24 .375" × .375" CROSS-SECTION (ungapped) |
| Primary core 242: | ferrite Cermag C24 .375" × 375" CROSS-SECTION gapped .123" |
| Secondary core 244: | ferrite Cermag C24 .375" × .375" gapped .087" |

Figure 7:
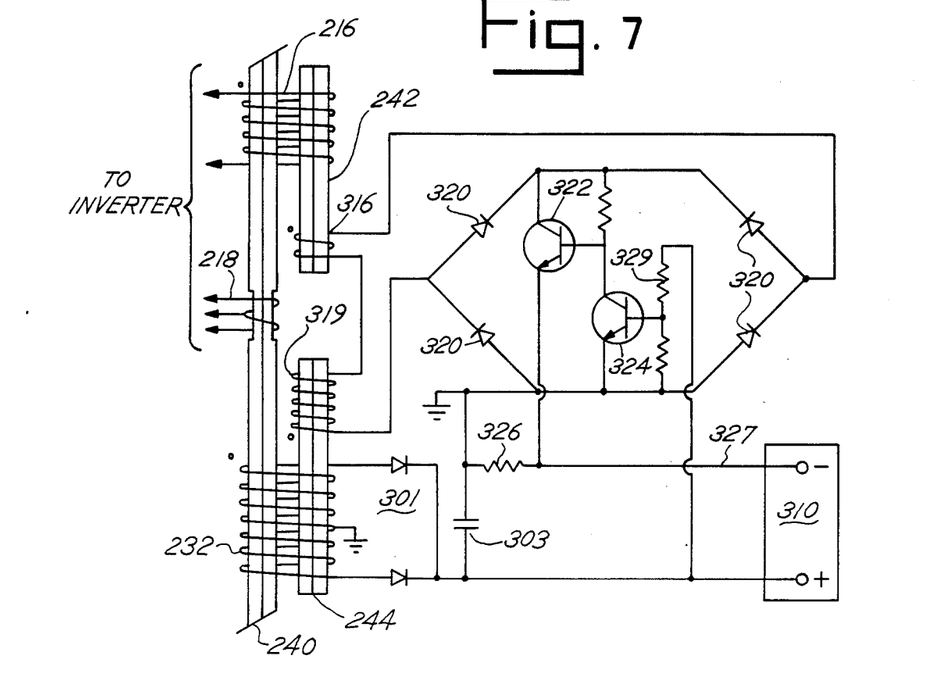
FIG. 7 is a schematic diagram of a fifth embodiment of the invention employing impedance control windings on a triple-core transformer and means for automatically adjusting the flow of current in those windings to control the level of energy delivered to the output circuit.

FIG. 7 of the drawings schematically illustrates the manner in which the novel triple-core inverter shown in FIG. 4 can be employed in combination with additional impedance control windings to provide a variety of controllable and/or regulated power supply systems.

The inverter which drives the primary winding 216 in the arrangement shown in FIG. 4 may be used to drive the primary winding also indicated at 216 in FIG. 7. The lamp load 230 of FIG. 4 has been replaced in FIG. 7 by a full-wave rectifier 301, a filter capacitor 303, and a D.C. load represented by the battery 310.

In accordance with a feature of the present invention, the magnitude of electrical energy delivered to the load by the triple-core inverter can be efficiently controlled by varying the coupling between a pair of windings wound respectively on the primary and secondary non-saturating cores 242 and 244, as seen in FIG. 7, a winding 316 wound on core 242 is serially connected with a winding 319 wound on the core 244. The magnitude of current which is permitted to flow through windings 316 and 319 is controlled by a diode bridge 320 and the two control transistors 322 and 324. A load-current sensing resistor 326 is serially connected with the output load circuit's negative lead 327 and is also connected between the emitter of transistor 322 and ground. In this way, the voltage at the emitter of transistor 322 varies with load current. The voltage at the base of transistor 322 is varied by transistor 324 in response to variations in output voltage by virtue of the voltage divider 329 which connects the base of transistor 324 to the load.

An increase in load current, or an increase in load voltage, tends to turn off the control transistor 322 and reduce the flow of current through the control windings 316 and 319. That reduced flow of control winding current increases the effective output impedance (inductance) of the overall circuit and hence regulates the level of energy delivered by the supply.

The method of varying the effective output impedance of the inverter which is contemplated by this aspect of the present invention may be explained as follows: the flow of current induced in winding 319 by the voltage induced across winding 316 produces a magnetomotive force (MMF) in the core 244 which opposes the MMF induced by the seconday winding 232. As a result, the magnitude of flux variation in core 244 is reduced, reducing the effective output inductance of the supply, and hence raising the output current level delivered to the battery load 310.

Although a regulated battery charging power supply has been illustrated in FIG. 7 by way of example, it will be understood that the control technique shown can be employed in a wide variety of applications. Because the control windings 316 and 319 are isolated from the remainder of the circuit, a variety of manually operated or automatic control circuits could be substituted for the arrangement shown. For example, a simple variable resistor may be used to serially connect the two control windings 316 and 319 to provide, as an example, a manual dimming control for a lamp load. In the battery charger of the example, the circuit may be arranged to be primarily responsive to load (battery) voltage, allowing the charging inverter to automatically reduce the level of charging current to optimum values as the charging cycle continues toward completion.

Figure 8:
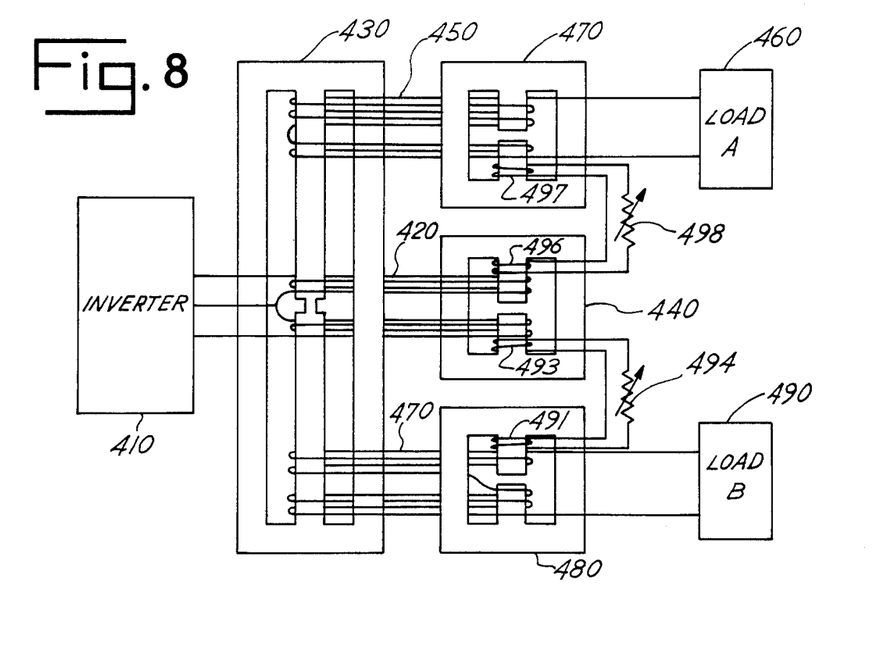
FIG. 8 is a schematic diagram of a four-core transformer arrangement for supplying controlled levels of alternating current energy to two load circuits.

The principles of the invention can also be applied to supply power to two or more loads at independently adjusted energy levels as illustrated in FIG. 8. An inverter circuit 410 (of the type shown in FIG. 4) supplies high-frequency alternating current energy to a primary winding 420 wound on the center legs of saturating core 430 and non-saturating core 440. The secondary winding 450 is wound on core 430 and a non-saturating core 470 and supplies power to a first load circuit (load A) seen at 460 in FIG. 8. A second secondary winding 470 wound on core 430 and a third non-saturating core 480 supplies power to a second load circuit (load B) seen at 490. Control windings 491 and 493 are wound on cores 480 and 440 respectively and are serially connected by means of a variable resistor 494. Similarly, control windings 496 and 497 wound on cores 440 and 470 respectively are connected by a variable resistor 498. Hence, control resistors 498 and 494 may be used to independently vary the level of energy delivered to load A and load B respectively.

It is to be generally understood that the embodiments of the invention which have been described are merely illustrative of the principles of the invention and that numerous modifications may be made to the arrangements disclosed without departing from the true spirit and scope of the invention.

What is claimed is:

1. In combination,
   a source of a direct current potential,
   a transformer comprising, in combination, a saturating core, first and second non-saturating cores each exhibiting substantially greater reluctance than said saturating core, a center-tapped primary winding wound on said saturating core and said first non-saturating core, a secondary winding wound on said saturating core and said second non-saturating core, and a feedback winding wound on said saturating core,
   a pair of semiconductor switching devices each having a control electrode and a transconductive path,
   circuit means for connecting one of said transconductive paths in series with said source across one half of said primary winding,
   circuit means for connecting the other of said transconductive paths in series with said source across the other half of said primary winding,
   circuit means for connecting said feedback winding to the said control electrodes to switch the conductivity of said transconductive paths in phase opposition in response to flux reversals in said saturating core,
   a capacitor connected in parallel with said primary winding, and
   a load circuit connected to said secondary winding.

2. The combination set forth in claim 1 wherein said load circuit includes at least one electron discharge lamp.

3. The combination set forth in claim 1 including
   first and second control windings wound on said first and second non-saturating cores respectively, and
   circuit means including a variable impedance for connecting said control windings in series.

4. The combination set forth in claim 1 wherein each of said cores is formed from two core sections which together form a figure-eight shaped core structure, said primary and said secondary windings are wound on insulating bobbins, said core sections and said bobbins being assembled such that the center leg of said saturating core passes through both of said bobbins, the central leg of said first non-saturating core passes through said primary winding bobbin alone, and the central leg of said second non-saturating core passes through said secondary winding bobbin alone.

5. The combination set forth in claim 4 wherein a portion of the central leg of said saturating core is cut away to form a zone of reduced cross-sectional area and wherein said control winding is wound around said central leg at said zone.

6. The combination set forth in claim 3 including means for sensing the level of output energy delivered to said load to produce a control signal and means responsive to said control signal for adjusting said variable impedance to regulate the level of energy delivered to said load.

7. In a saturable core DC to AC inverter of the class comprising, in combination, a transformer having primary, secondary and feedback windings wound on a first ferromagnetic core having a substantially square hysteresis characteristic, transistor switching means coupling said primary winding to a source of a direct current potential, the conductivity of said transistor switching means being controlled by the voltage induced in said feedback winding, and a load circuit connected to said secondary winding,
   the improvement comprising:
      a second ferromagnetic core positioned adjacent to said first core inside said primary winding but outside of said feedback winding, said second core being composed of a material having a substantially smaller permeability than said first core and being non-saturable when subjected to a magnetic field strength adequate to saturate said first core.

8. The improvement set forth in claim 7 wherein said secondary winding is wound on said first core but not on said second core.

9. The improvement of claim 7 wherein said primary and secondary windings comprise a single autotransformer winding, the primary portion of which is wound on both said first and said second cores.

10. The improvement of claim 9 wherein at least a substantial portion of the secondary winding portion of said autotransformer winding is wound on said second core but not on said first core.

11. The improvement of claims 7, 8, 9 or 10 wherein said load circuit comprises a gas discharge lamp connected to receive energy from said secondary winding.

12. The improvement of claim 10 wherein said portion of said secondary winding is at least partially sandwiched between said first and second cores such that said portion exhibits a substantial leakage inductance.

13. A high-frequency power supply comprising, in combination,
   first and second toroidal ferromagnetic core structures, said first core structure being composed of a magnetically saturable ferromagnetic material having a substantially square hysteresis characteristic and said second core structure being composed of a different ferromagnetic material which possesses substantially less permeability than said first structure and which does not saturate when subjected to a magnetic field of sufficient strength to saturate said first core,
   a primary winding wound around both said first and said second core structures,
   a secondary winding wound on at least one of said core structures,
   a load circuit connected to said secondary winding,
   a feedback winding wound around said first core but not around said second core structure,
   a source of a direct current operating potential,
   at least one transistor switch having a control input and a switchable transconductive path connected between said source and said primary winding, and means connecting said feedback winding to said control input of said transistor to cause said transconductive path to switch conductivity states in response to the saturation of said first core structure.

14. A power supply as set forth in claim 13 wherein said load circuit includes an electron discharge lamp.

15. A power supply as set forth in claim 14 wherein said first and second core structures are closely spaced with at least a portion of said secondary winding being wound around said second core alone.

16. A power supply as set forth in claim 15 wherein part of said portion of said secondary winding is sandwiched between said first and second cores such that said portion exhibits leakage inductance to limit the current in said discharge lamp.

17. Apparatus for supplying a controlled level of alternating current electrical power to an electron discharge lamp which comprises, in combination, first and second cores of ferromagnetic material forming two independent closed magnetic flux paths, a primary winding wound about said first core only, said primary winding being connected to a source of alternating-current energy, a secondary winding wound about said first and said second cores and connected to supply alternating current energy to an electron-discharge lamp, said second core being non-saturable and producing sufficient self-inductance in said secondary winding to limit the flow of current through said lamp.

18. Apparatus as set forth in claim 17 wherein said source of alternating current energy comprises a semiconductor inverter circuit having output terminals connected to said primary winding and including at least one semiconductor switching device whose conductivity is controlled in response to a feedback signal developed across a feedback winding wound on said first core, said first core being adapted to magnetically saturate.

19. Apparatus as set forth in claim 17 including a lamp starting circuit comprising a source of a current impulse connected to a starting winding wound on said second core, said starting winding and said secondary winding together forming a step-up transformer for delivery a high starting voltage impulse to said lamp.

20. Apparatus as set forth in claim 19 wherein said source of a current impulse comprises an accumulating capacitor serially connected with a charging circuit across said lamp and a threshold circuit for discharging said accumulating capacitor through said starting winding whenever the voltage across said lamp exceeds a predetermined value.

* * * * *